(12) United States Patent
Disser

(10) Patent No.: US 6,851,765 B1
(45) Date of Patent: Feb. 8, 2005

(54) SYSTEM AND METHOD FOR CONTROLLING A BRAKE MOTOR

(75) Inventor: Robert J. Disser, Dayon, OH (US)

(73) Assignee: Delphi Technologies, Inc., Troy, MI (US)

( * ) Notice: Subject to any disclaimer, the term of this patent is extended or adjusted under 35 U.S.C. 154(b) by 7 days.

(21) Appl. No.: 10/650,642

(22) Filed: Aug. 28, 2003

(51) Int. Cl.$^7$ ................................................. B60T 8/88
(52) U.S. Cl. ........................ 303/122.05; 303/122.03; 303/20
(58) Field of Search .............................. 188/158, 159, 188/160, 161, 162; 303/20, 199, 122.03, 122.04, 122.05; 310/68 C; 318/434, 632, 634

(56) References Cited

U.S. PATENT DOCUMENTS

| | | | | |
|---|---|---|---|---|
| 5,341,077 A | * | 8/1994 | Chen et al. ................. | 318/434 |
| 6,111,330 A | * | 8/2000 | Lochmahr et al. ........ | 310/68 C |
| 6,199,670 B1 | * | 3/2001 | Shirai et al. ................. | 303/20 |
| 6,407,528 B1 | | 6/2002 | Disser et al. | |
| 6,411,061 B1 | | 6/2002 | Disser et al. | |

\* cited by examiner

*Primary Examiner*—Thomas Williams
(74) *Attorney, Agent, or Firm*—Michael D. Smith

(57) ABSTRACT

The present invention includes a method for controlling brake motor. The method includes receiving brake motor information, determining a first brake motor voltage value and a brake motor current value based on the motor information when the brake motor is active, determining a brake motor resistance value based on the first brake motor voltage value and the brake motor current value, determining a brake motor temperature value based on the determined brake motor resistance value, and producing a brake motor control signal based on the determined brake motor temperature value. The method may additionally include determining a second brake motor voltage value when the brake motor is inactive, and producing a motor diagnostic voltage value based on the determined second brake motor voltage value.

4 Claims, 3 Drawing Sheets

SYSTEM AND METHOD FOR CONTROLLING A BRAKE MOTOR

FIELD OF THE INVENTION

The technical field of this disclosure is brake systems, and more particularly, electric brake systems and electric brake systems within hybrid brake systems.

BACKGROUND OF THE INVENTION

Control of brake systems is an important aspect of automotive functionality. Brake systems must engage when required, such as, for example during application of caliper pressure to slow or stop a vehicle. Additionally, brake systems must remain unengaged when not required. The vehicle will not be able to function as designed if brake systems, or portions of brake systems, function improperly. One cause of brake system failure is excessive heat.

Recently, hybrid brake systems have become increasingly utilized in the automotive industry. Hybrid systems typically utilize a hydraulic brake system for one axel (i.e. the front axel) and an electric or electro-mechanical brake system for the other axel. Additionally, electric or electro-mechanical only brake systems have become increasingly utilized in the automotive industry as well.

In electric or electro-mechanical brake systems, temperature sensing is a critical issue to protect the motor and electronics of the electric caliper. Currently, temperature sensing activity in the industry is centered around a temperature sensor mounted on the main circuit board, such as, for example the controller circuit board. Unfortunately, the circuit board is not the only critical thermal element within electric or electro-mechanical brake systems.

The present invention advances the state of the art in controlling brake motors.

SUMMARY OF THE INVENTION

One aspect of the invention includes a method for controlling a brake motor by receiving brake motor information, determining a first brake motor voltage value and a brake motor current value based on the motor information when the brake motor is active, determining a brake motor resistance value based on the first brake motor voltage value and the brake motor current value, determining a brake motor temperature value based on the determined brake motor resistance value, and producing a brake motor control signal based on the determined brake motor temperature value.

In accordance with another aspect of the invention, a computer readable medium storing a computer program includes: computer readable code for determining a first brake motor voltage value and a brake motor current value based on motor information when a brake motor is active; computer readable code for determining a brake motor resistance value based on the first brake motor voltage value and the brake motor current value; computer readable code for determining a brake motor temperature value based on the determined brake motor resistance value; and computer readable code for producing a brake motor control signal based on the determined brake motor temperature value.

In accordance with yet another aspect of the invention, a system for controlling a brake motor is provided. The system includes means for receiving brake motor information. The system additionally includes means for determining a first brake motor voltage value and a brake motor current value based on the motor information when the brake motor is active. Means for determining a brake motor resistance value based on the first brake motor voltage value and the brake motor current value is provided. Means for determining a brake motor temperature value based on the determined brake motor resistance value and means for producing a brake motor control signal based on the determined brake motor temperature value is also provided.

The foregoing and other features and advantages of the invention will become further apparent from the following detailed description of the presently preferred embodiment, read in conjunction with the accompanying drawings. The scope of the invention is defined by the appended claims and equivalents thereof, the detailed description and drawings being merely illustrative of the invention rather than limiting the invention.

Throughout the specification, and in the claims, the term "connected" means a direct connection between components or devices that are connected without any intermediate devices. The term "coupled" means either a direct connection between components or devices that are connected, or an indirect connection through one or more passive or active intermediary devices.

DETAILED DESCRIPTION OF THE PRESENTLY PREFERRED EMBODIMENT

Figure 1:
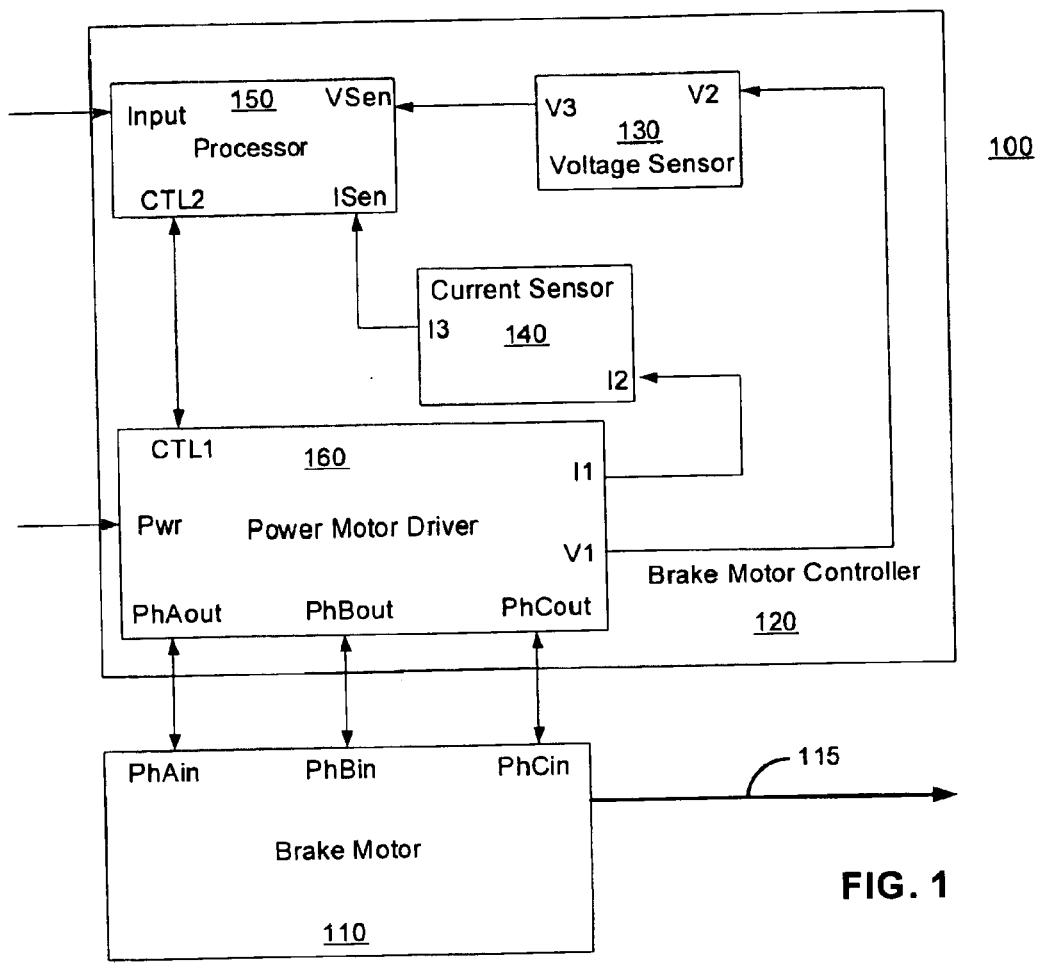
FIG. 1 is a block diagram illustrating a brake motor control system according to an embodiment of the present invention.

FIG. 1 is a block diagram illustrating a brake motor control system 100. FIG. 1 details an embodiment of a system for controlling a brake motor 110 within a brake system in accordance with the present invention. Brake motor control system 100 includes brake motor 110 and brake motor controller 120. Brake motor 110 includes motor shaft 115 coupled to brake motor 110. Brake motor controller 120 includes voltage sensor 130, current sensor 140, processor 150, and power motor driver 160. Brake motor control system 100 may include additional components not relevant to the present discussion.

In one embodiment and illustrated in FIG. 1, brake motor 110 is implemented as a three-phase direct current (DC) motor, which is a commonly known and utilized technology in the motor industry. In other embodiments, brake motor 110 is implemented as a direct current (DC) brush-type motor or multi-phase motors, such as, for example a 4-phase switched reluctance motor. In FIG. 1, brake motor 110 includes three phase stator winding inputs (e.g. terminals) (PhAin, PhBin, and PhCin) and motor shaft 115. Brake motor 110 may include additional components not relevant to the present discussion.

Brake motor controller 120 is a composite assembly that provides motor control functions, such as, for example motor sensing, speed estimation, rotor location information, and motor drive control. Brake motor controller 120 is any suitable device capable of providing motor control functions. Brake motor controller 120 typically includes a microcontroller, a processor, a combination of a microcontroller and processor, software modules for performing motor control functions, hardware modules for providing brake motor information, and volatile or non-volatile memory. Brake motor controller 120 may include additional components not relevant to the present discussion. Brake motor controller 120 may be implemented as any suitable brake motor controller as is commonly known technology in the motor control industry. In one embodiment and referring to FIG. 1, brake motor controller 120 includes voltage sensor 130, current sensor 140, processor 150, and power motor driver 160. In another embodiment, voltage sensor 130 and current sensor 140 are located elsewhere within brake motor control system 100 and in communication with brake motor controller 120 and processor 150.

Power motor driver 160 is a motor control element that receives instructions from processor 150 and provides control signals to brake motor 110. Power motor driver 160 additionally provides brake motor information such as, for example brake motor voltage information and brake motor current information to sensors located within brake motor control system 100. Power motor driver 160 includes power input terminal Pwr, control input/output terminal CTL 1, current output terminal 11, voltage output terminal V1, and output control phase terminals (PhAout, PhBout, and PhCout). Current output terminal 11 and voltage output terminal V1 provide brake motor information. In one embodiment and described in FIG. 2 below, voltage output terminal V1 includes three signal outputs with each signal output coupled to an output control phase terminal (PhAout, PhBout, and PhCout) and providing phase voltage information. In this embodiment and described in FIG. 3 below, current output terminal 11 includes a signal output providing DC motor current information. In another embodiment, current output terminal 11 includes three signal outputs with each signal output coupled to an output control phase terminal (PhAout, PhBout, and PhCout) and providing link current information.

Voltage sensor 130 is a voltage sensing apparatus that includes voltage input terminal V2 and voltage output terminal V3. Voltage sensor 130 is further described in FIG. 2, below. Voltage input terminal V2 is coupled to voltage output terminal V1 of power motor driver 160. Voltage sensor 130 receives phase voltage information from power motor driver 160 and provides scaled analog voltage information to processor 150 via voltage output terminal V3.

Current sensor 140 is a current sensing apparatus that includes current input terminal I2 and current input/output terminal I3. Current sensor 140 is further described in FIG. 3, below. Current input terminal I2 is coupled to current output terminal 11 of power motor driver 160. In one embodiment, current sensor 140 receives link current information from power motor driver 160 via current input terminal I2 and sensor control signals from processor 150 via input/output terminal I3, samples the link current, and provides scaled motor current information to processor 150 via input/output terminal I3.

In another embodiment, current sensor 140 receives link current information via current input terminal I2 and provides scaled link current information to processor 150 via input/output terminal I3.

Processor 150 includes control input/output terminal CTL2, control input terminal (Input), voltage sensor input terminal VSen, and current sensor input terminal ISen.

Control input/output terminal CTL2 is coupled to control input/output terminal CTL1 of power motor driver 160, voltage sensor input terminal VSen is coupled to voltage output terminal V3 of voltage sensor 130, and current sensor input terminal ISen is coupled to current input/output terminal I3 of current sensor 140. Processor 150 may include additional components not relevant to the present discussion. Processor 150 receives a system control signal via control input terminal (Input), such as, for example to activate brake motor 110 or to deactivate brake motor 110. When processor 150 receives a system control signal to activate brake motor 110 and brake motor information from voltage sensor 130 and current sensor 140, processor 150 produces a brake motor control signal, such as, for example a pulse-width modulated control signal that is applied to brake motor 110 for torque production.

In operation, power motor driver 160 receives power from power input terminal Pwr and a control signal from control input/output terminal CTL 1, such as, for example a pulse-width modulated (PWM) control signal. Power is applied to a three-phase winding within brake motor 110 based on the control signal thereby powering the brake motor 110 and the coupled motor shaft 115. Power motor driver 160 produces brake motor information that is dependent on conditions present within brake motor 110 and provides the brake motor information to voltage sensor 130 and current sensor 140. Phase voltage information is provided to voltage sensor 130 at voltage output terminal V1 of power motor driver 160. Link current information is provided to current sensor 140 at current output terminal 11 of power motor driver 160.

Figure 2:
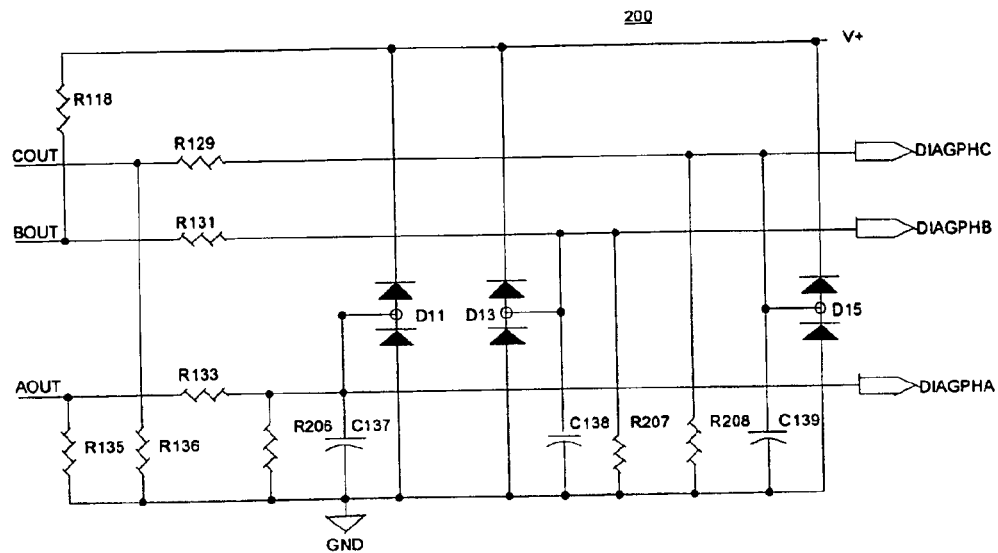
FIG. 2 is a schematic diagram illustrating a voltage sensing apparatus according to an embodiment of the present invention.

FIG. 2 is a schematic diagram illustrating a voltage sensing apparatus 200. In one embodiment and illustrated in FIGS. 1 and 2, voltage sensing apparatus 200 senses voltage from brake motor 110 that is implemented as a three-phase direct current (DC) motor. In other embodiments, voltage sensing apparatus 200 senses voltage from brake motor 110 that is implemented as a direct current (DC) brush-type motor or multi-phase motors, such as, for example a 4-phase switched reluctance motor. Voltage sensing apparatus 200 includes three single-phase voltage inputs (Aout, Bout, and Cout) and three single-phase voltage outputs (DiagphA, DiagphB, and DiagphC). Each single-phase voltage input has an associated single-phase voltage output (e.g., Aout and DiagphA). In one embodiment and referring to FIG. 1 above, voltage sensing apparatus 200 is implemented as voltage sensor 130. In this embodiment, three single-phase voltage inputs (Aout, Bout, and Cout) are received at voltage input terminal V2 and three single-phase voltage outputs (DiagphA, DiagphB, and DiagphC) are produced at voltage output terminal V3.

Voltage sensing apparatus 200 provides a step-down analog voltage at each single-phase voltage output (DiagphA, DiagphB, and DiagphC) when the voltage source is active, referred to as a stall condition. Voltage information in the form of a PWM motor driver voltage signal is received at each of the three single-phase voltage inputs (Aout, Bout, and Cout) and is passed through a voltage divider to scale the voltage for use by a processor. The scaled voltage is passed through a low pass filter for removal of the high frequency PWM portion of the analog voltage signal and provide a DC analog voltage to the processor which is proportional to motor voltage. A diode pair is provided for over-voltage protection.

In one embodiment, a PWM voltage signal received at single-phase voltage input Aout is passed through the voltage divider of resistors (R133 and R206) to scale the voltage. In an example, the voltage divider of resistors (R133 and R206) is implemented as resistors having values of 10.0 kilo-ohms and 4.02 kilo-ohms respectively. In this embodiment, the scaled voltage is passed through low pass filter (C137) to single-phase voltage output DiagphA. In an example, low pass filter (C137) is implemented as a 0.1 microfarad capacitor. Additionally in this embodiment, diode pair (D11) is provided for over-voltage protection. In an example, diode pair (D11) is implemented as MMBD 1203 diode that is an industry standard diode available from major silicon manufactures. Diode pair (D11) is a single part that contains both diodes in a single package. Alternatively, diode pair (D11) can be implemented as two individual diodes utilizing a similar configuration.

Similarly, a PWM voltage signal received at single-phase voltage input Bout is passed through the voltage divider of resistors (R131 and R207) to scale the voltage. In an example, the voltage divider of resistors (R131 and R207) is implemented as resistors having values of 10.0 kilo-ohms and 4.02 kilo-ohms respectively. In this embodiment, the scaled voltage is passed through low pass filter (C138) to single-phase voltage output DiagphB. In an example, low pass filter (C138) is implemented as a 0.1 microfarad capacitor. Additionally in this embodiment, diode pair (D13) is provided for over-voltage protection. In an example, diode pair (D13) is implemented as MMBD 1203 diode that is an industry standard diode available from major silicon manufactures. Diode pair (D13) is a single part that contains both diodes in a single package. Alternatively, diode pair (D13) can be implemented as two individual diodes utilizing a similar configuration.

Additionally, a PWM voltage signal received at single-phase voltage input Cout is passed through the voltage divider of resistors (R129 and R208) to scale the voltage. In an example, the voltage divider of resistors (R129 and R208) is implemented as resistors having values of 10.0 kilo-ohms and 4.02 kilo-ohms respectively. In this embodiment, the scaled voltage is passed through low pass filter (C139) to single-phase voltage output DiagphC. In an example, low pass filter (C139) is implemented as a 0.1 microfarad capacitor. Additionally in this embodiment, diode pair (D15) is provided for over-voltage protection. In an example, diode pair (D15) is implemented as MMBD 1203 diodes that is an industry standard diode available from major silicon manufactures. Diode pair (D15) is a single part that contains both diodes in a single package. Alternatively, diode pair (D15) can be implemented as two individual diodes utilizing a similar configuration.

Further, voltage sensing apparatus 200 provides a closed-loop motor diagnostic voltage at each single-phase voltage output (DiagphA, DiagphB, and DiagphC) when the voltage source (e.g. brake motor) is inactive. When the voltage source is inactive, a closed circuit is created across the three single-phase voltage inputs (Aout, Bout, and Cout) by the low impedance of the motor stator windings resulting in current flowing from an internal voltage supply V+ to ground GND. The current flows through resistors (R118, R135, and R136) and settles at a specific value, depending on the value of resistors (R118, R135, and R136) and the voltage value supplied from internal voltage supply V+, and is referred to as the closed-loop motor diagnostic voltage value. In one embodiment and referring to FIG. 1 above, voltage sensing apparatus 200 is implemented as voltage sensor 130. In this embodiment, the closed-loop motor diagnostic voltage value is produced at voltage output terminal V3 of voltage sensor 130.

Figure 3:
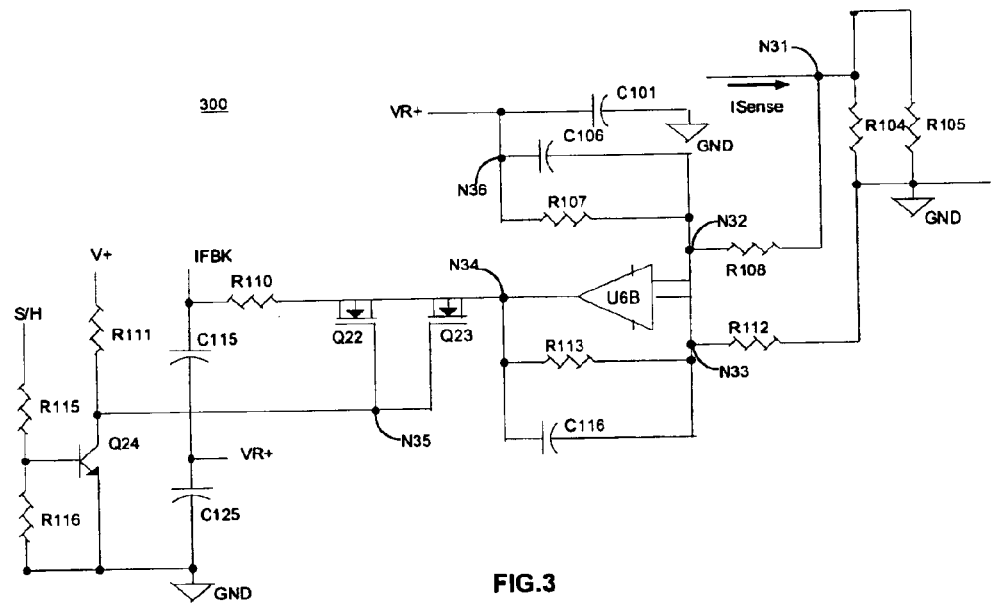
FIG. 3 is a schematic diagram illustrating a current sensing apparatus that may be utilized with the method of the invention.

FIG. 3 is a schematic diagram illustrating a current sensing apparatus 300 that may be utilized with the method of the invention. Current sensing apparatus 300 illustrates one possible embodiment of circuitry to measure motor current of a brake motor, such as, for example as described in U.S. Pat. No. 6,262,544 B1 issued on Jul. 17, 2001 and titled FOUR QUADRANT MOTOR OPERATION USING DC BUS CURRENT SENSING. In one embodiment and illustrated in FIGS. 1 and 3, current sensing apparatus 300 senses current from brake motor 110 that is implemented as a three-phase direct current (DC) motor. In other embodiments, current sensing apparatus 300 senses current from brake motor 10 that is implemented as a direct current (DC) brush-type motor or multi-phase motors, such as, for example a 4-phase switched reluctance motor. In one embodiment and referring to FIG. 1 above, current sensing apparatus 300 is implemented as current sensor 140.

In operation, current sensing apparatus 300 receives a DC link current (ISense) from a brake motor at node N31. A motor driver bridge portion of current sensing apparatus 300 includes current sense resistors (R104 and R105). The motor driver bridge portion of current sensing apparatus 300 provides input to amplifier U6B at nodes (N32 and N33). Resistors (R108 and R112) provide input impedance for amplifier U6B. In one embodiment, current sense resistors (R104 and R105) are implemented as 0.01 ohm resistors and resistors (R108 and R112) are implemented as 3.83 kilo-ohm resistors.

A DC offset portion of current sensing apparatus 300 includes voltage input VR+ and capacitor (C101). The DC offset portion of current sensing apparatus 300 provides a DC offset at node N36. In one embodiment, capacitor (C101) is implemented as a 0.1 microfarad capacitor. In this embodiment, voltage input VR+ provides a 2.5 volt DC offset at node N36.

An amplifier portion of current sensing apparatus 300 includes amplifier U6B, resistors (R113, R107, R108, and R112) and capacitors (C106 and C116) configured as a differential amplifier. Amplifier U6B amplifies the current sense signal to a level that can be utilized by a microprocessor analog-to-digital (A/D) input at node N34. In one embodiment, amplifier U6B is implemented as an MC33072 amplifier that is an industry standard amplifier available from major chip manufactures. In this embodiment, resistors (R107 and R113) are implemented as 24.9 kilo-ohm resistors and capacitors (C 106 and C116) are implemented as 47 picofarad capacitors. In this embodiment, resistors (R107 and R113) are of equal value and resistors (R108 and R112) are of equal value. The gain of the amplifier is equal to the ratio of resistors (R113 and R112) expressed as R113/R112.

A sample and hold switch portion of current sensing apparatus 300 includes sample and hold voltage input (S/H), voltage input V+, transistor Q24, resistors (R111, R115, and R116), voltage input VR+, and capacitor C125. The sample and hold switch portion of current sensing apparatus 300 provides a control voltage at node N35 that controls a sample and hold portion of current sensing apparatus 300. In one embodiment, transistor Q24 is implemented as an MMBT100 transistor that is an industry standard transistor available from major silicon manufactures. In this embodiment, resistors (R111, R115, and R116) are implemented as 4.99 kilo-ohm, 10.0 kilo-ohm, and 10.0 kilo-ohm respectively. Capacitor C125 is implemented as a 0.1 microfarad capacitor.

The sample and hold portion of current sensing apparatus 300 includes transistors (Q22 and Q23), resistor RI 10, capacitor C115, and sampled motor current signal output IFBK. Transistors (Q22 and Q23) provide a sample and hold function and capacitor C115 stores the sampled motor current signal. The sampled motor current signal is monitored by the microprocessor at sampled motor current signal output IFBK as an analog input channel. The signal may be used for closed-loop motor current control as well. In one embodiment, transistors (Q22 and Q23) are implemented as 2N7002 transistors that are industry standard transistors available from major silicon manufactures. In this embodiment, resistor R110 is implemented as a 10.0 ohm resistor and capacitor C115 is implemented as a 0.1 microfarad capacitor.

Figure 4:
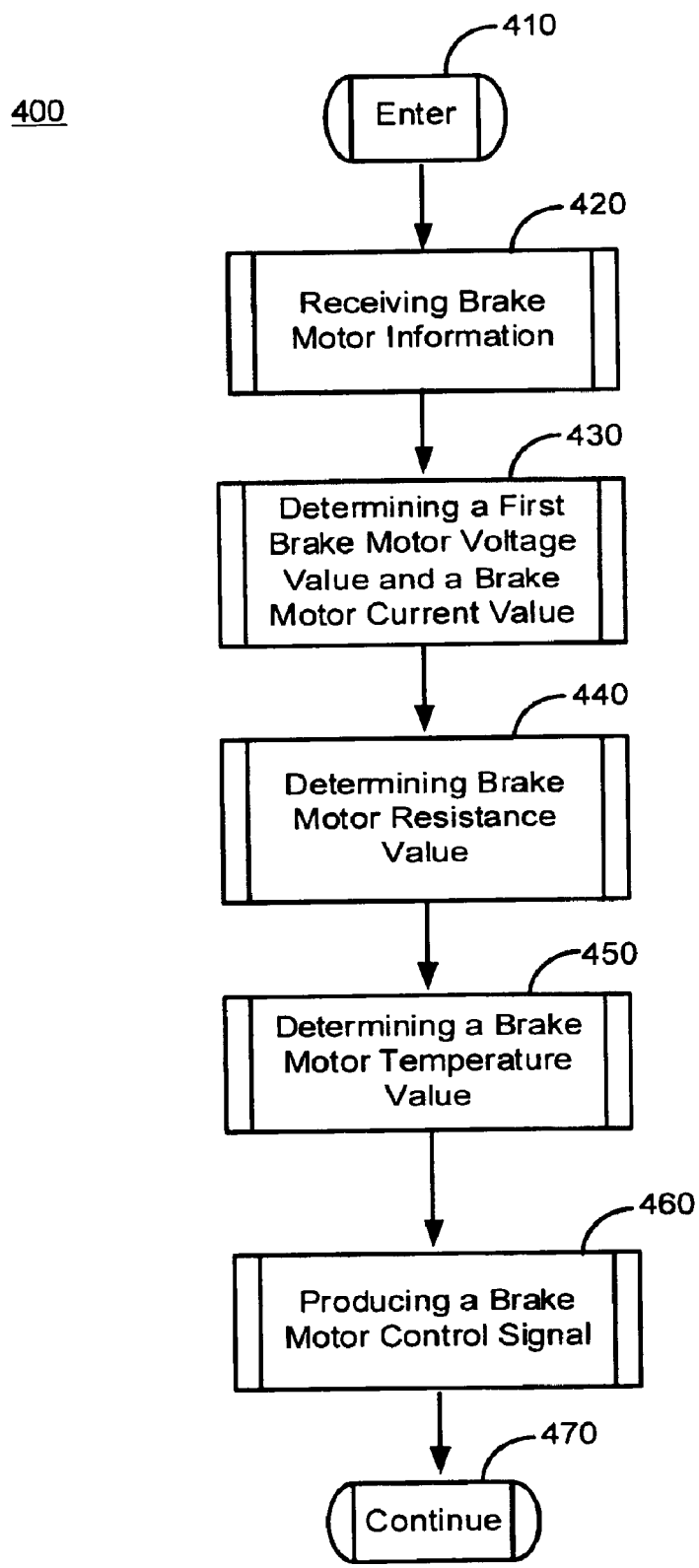
FIG. 4 is a flow diagram illustrating a method for controlling a brake motor according to an embodiment of the present invention.

FIG. 4 is a flow diagram illustrating a method 400 for controlling a brake motor.

Method 400 may utilize one or more systems detailed in FIGS. 1–3, above. The present invention can also take the form of a computer usable medium including a program for configuring an electronic module within a vehicle. The program stored in the computer usable medium comprises computer program code for executing the method steps described in FIG. 4. Method 400 begins at block 410.

At block 420, brake motor information is received. In one embodiment, brake motor information includes brake motor voltage information and brake motor current information. In an example, brake motor current information includes link current information. In another example, brake motor current information includes motor current information. In one embodiment and referring to FIG. 1, brake motor controller 120 receives brake motor information from brake power motor driver 160. In another embodiment and referring to FIG. 1, voltage sensor 130 receives brake motor voltage information from brake power motor driver 160 and current sensor 140 receives brake motor current information from brake power motor driver 160.

At block 430, a first brake motor voltage value and a brake motor current value are determined based on the motor information when the brake motor is active. In one embodiment, the first brake motor voltage value is determined by determining a first and a second active phase brake motor voltage values of the three-phase brake motor, and determining an absolute value of the difference of the first and the second active phase brake motor voltage values. In an example and referring to FIG. 2 above, the two active phases of the three single-phase voltage outputs (DiagphA, DiagphB, and DiagphC) are determined and an absolute value of the difference of the two active phases results in the first brake motor voltage value.

In another embodiment, the brake motor current value is determined by sampling a DC link current, such as, for example as described in patent number 6,262,544 B1 issued on Jul. 17, 2001 and titled FOUR QUADRANT MOTOR OPERATION USING DC BUS CURRENT SENSING. In another example, brake motor current value is determined by sampling a DC link current as described in FIG. 3, above. In yet another embodiment, the brake motor current value is determined by directly measuring the stator winding current of the active phases.

At block 440, a brake motor resistance value is determined based on the first brake motor voltage value and the brake motor current value. In one embodiment, the brake motor resistance value is determined utilizing Ohm's law (R=V/I). In an example and referring to FIG. 1 above, processor 150 determines the resistance value based on the first brake motor voltage value received from voltage sensor 130 and brake motor current value received from current sensor 140.

At block 450, a brake motor temperature value is determined based on the determined brake motor resistance value. In one embodiment, the brake motor temperature value is determined by comparing the determined brake motor resistance value to a database, identifying the brake motor temperature value associated with the brake motor resistance value, and receiving the brake motor temperature value from the database. In an example, the database is implemented as a look-up table including an associated brake motor temperature value for each brake motor resistance value.

At block 460, a brake motor control signal is produced based on the determined brake motor temperature value. In one embodiment, the brake motor control signal is produced based on the determined brake motor temperature value and control input received in the form of a system control signal. In an example and referring to FIG. 1, processor 150 produces the brake motor control signal based on the determined brake motor temperature value and control input received via control input terminal (Input).

At block 470, the method ends.

Additionally, method 400 may further include a diagnostic methodology. In one embodiment, the diagnostic methodology of method 400 includes determining a second brake motor voltage value when the brake motor is inactive and producing a motor diagnostic voltage value based on the determined second brake motor voltage value. In an example, the diagnostic methodology is implemented as described in FIG. 2, above.

The above-described system and method for controlling a brake motor is an example system and method. The system and method for controlling a brake motor illustrates one possible approach for controlling a brake motor. The actual implementation may vary from the package discussed. Moreover, various other improvements and modifications to this invention may occur to those skilled in the art, and those improvements and modifications will fall within the scope of this invention as set forth in the claims below.

The present invention may be embodied in other specific forms without departing from its essential characteristics. The described embodiments are to be considered in all respects only as illustrative and not restrictive.

I claim:

1. A method for controlling a brake motor, the method comprising:

receiving brake motor information;

determining a first brake motor voltage value and a brake motor current value based on the motor information when the brake motor is active;

determining a brake motor resistance value based on the first brake motor voltage value and the brake motor current value;

determining a brake motor temperature value based on the determined brake motor resistance value;

producing a brake motor control signal based on the determined brake motor temperature value;

determining a second brake motor voltage value when the brake motor is inactive; and producing a motor diagnostic voltage value based on the determined second brake motor voltage value.

2. A method for controlling a brake motor, the method comprising:

receiving brake motor information;

determining a first brake motor voltage value and a brake motor current value based on the motor information when the brake motor is active;

determining a brake motor resistance value based on the first brake motor voltage value and the brake motor current value;

determining a brake motor temperature value based on the determined brake motor resistance value; and producing a brake motor control signal based on the determined brake motor temperature value;

wherein determining the first brake motor voltage value comprises:

determining a first and a second active phase brake motor voltage values of the brake motor; and determining an absolute value of the difference of the first and the second active phase brake motor voltage values.

3. A computer readable medium storing a computer program comprising:

computer readable code for determining a first brake motor voltage value and a brake motor current value based on motor information when a brake motor is active;

computer readable code for determining a brake motor resistance value based on the first brake motor voltage value and the brake motor current value;

computer readable code for determining a brake motor temperature value based on the determined brake motor resistance value;

computer readable code for producing a brake motor control signal based on the determined brake motor temperature value;

computer readable code for determining a second brake motor voltage value when the brake motor is inactive; and computer readable code for producing a motor diagnostic voltage value based on the determined second brake motor voltage value.

4. A computer readable medium storing a computer program comprising:

computer readable code for determining a first brake motor voltage value and a brake motor current value based on motor information when a brake motor is active;

computer readable code for determining a brake motor resistance value based on the first brake motor voltage value and the brake motor current value;

computer readable code for determining a brake motor temperature value based on the determined brake motor resistance value; and computer readable code for producing a brake motor control signal based on the determined brake motor temperature value;

wherein the computer readable code for determining the first brake motor voltage value comprises:

computer readable code for determining a first and a second active phase brake motor voltage values of brake motor; and computer readable code for determining an absolute value of the difference of the first and the second active phase brake motor voltage values.

* * * * *